April 26, 1955  H. FRITSCHI ET AL  2,706,892
TRACER CONTROL CIRCUIT FOR PATTERN CONTROLLED MACHINES
Filed Oct. 12, 1953

INVENTORS.
HANS FRITSCHI
ALBERT H. DALL
BY H. K. Parsons & L. W. Wright
ATTORNEYS.

United States Patent Office 2,706,892
Patented Apr. 26, 1955

2,706,892

TRACER CONTROL CIRCUIT FOR PATTERN CONTROLLED MACHINES

Hans Fritschi, Amberley Village, and Albert H. Dall, Cincinnati, Ohio, assignors to The Cincinnati Milling Machine Co., Cincinnati, Ohio, a corporation of Ohio Application October 12, 1953, Serial No. 385,455

4 Claims. (Cl. 60—97)

This invention relates to improvements in tracer control circuits for governing automatic operation of pattern controlled machines.

It is well known to those skilled in the art that machines of the character described herein have means for producing movement in two angularly related directions, usually including two slides arranged normal to each other, so that by properly proportioning the rates of movement of each, a final resultant feed movement between tool and work can be effected in any desired angular direction throughout 360 degrees in the plane of operation. An automatic tracer is utilized to constantly control said proportioning and thereby the angle of the resultant movement so that the finished work piece will conform to a given pattern. Thus, the tracer controls the direction but not the rate in that direction which remains substantially constant.

When the direction of the pattern line changes by small angular amounts, it is not troublesome, but when large angular changes in direction are necessary, difficulty is experienced in effecting the change in direction in the time allotted by the prevailing feed rate without overrun by the cutter. Since the tracer cannot adequately vary the feed rate at these critical points, the prevailing feed rate has to be kept low, which is much lower than the cutting capacity of the cutter.

By means of this invention, the feed rate is automatically lowered at the direction change points of a profile, even to the extent of almost stopping the feed, to allow sufficient time for the tracer to change the direction without overrun of the cutter.

One of the objects of this invention is to improve tracer controlled circuits, so that faster feed rates, more in line with the cutting capacity of the cutter, can be utilized to a greater extent, by making provision for lowering the feed rate at change points in the direction of tracing.

Another object of this invention is to provide separate means for controlling the direction and controlling the feed rate of a profiling operation so that the extent of movement of each control is independent of the other and suitable to the requirements of the specific operation whereby better control and faster rates of reproduction can be obtained.

A further object of this invention is to provide a rate control means for a tracer controlled operation which is responsive to deflection of the tracer but effective before the tracer institutes a direction change whereby the feed rate can be effectively reduced at direction changing points in the profile being traced.

Other objects and advantages of the present invention should be readily apparent by reference to the following specification, considered in conjunction with the accompanying drawing forming a part thereof, and it is to be understood that any modifications may be made in the exact structural details there shown and described, without the scope of the appended claims, without departing from or exceeding the spirit of the invention.

Referring to the drawing in which like reference numerals indicate like or similar parts:

Figures 1, 2:
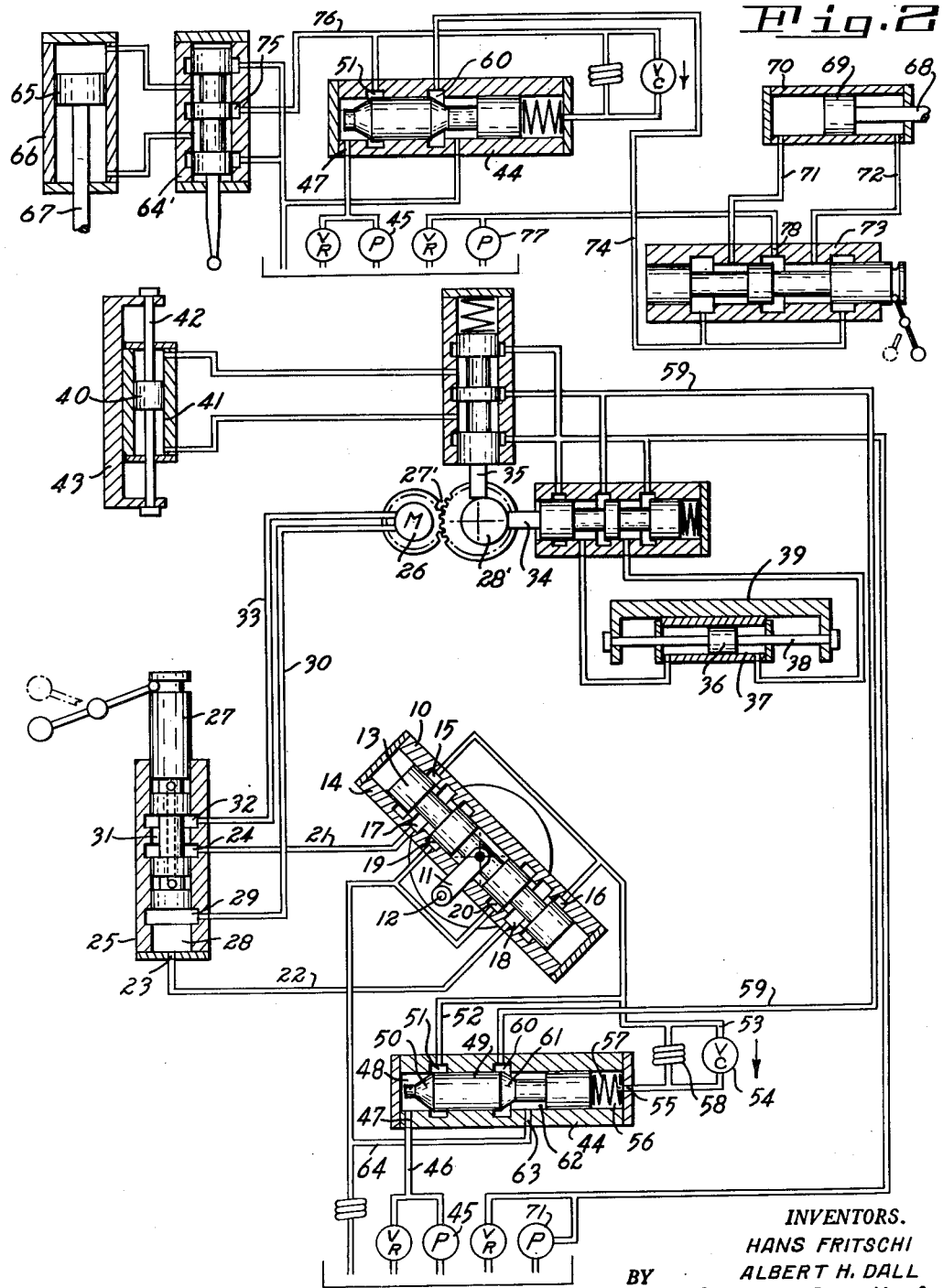
Figure 1 is a diagrammatic view of an improved tracer control circuit illustrating the principles of this invention.
Figure 2 is a diagrammatic view of a modified form of circuit.

In the operation of tracer controlled machine tools, a tracer is utilized to control the proportional rates of power movement of two slides, usually arranged normal to each other, in such a manner as to produce a cutting path between a tool and a work piece that corresponds to the outline of a pattern. The proportioning of the rates, which is on a sine and cosine basis, produces a final or resultant feed rate automatically, which is substantially constant and which the tracer cannot vary. However, it has now become desirable that the feed rate also be automatically varied so that faster feed rates can be utilized when the outline being followed is practically straight, and the rate decreased only when sharp changes in contour are encountered. In the drawings, a tracer control circuit is shown in Figure 1 in which a tracer valve controlled by a tracer determines reversible operation of a hydraulic steering motor to select the direction, and other valve means responsive to the deflection of the tracer provided for automatically varying the feed rate.

The tracer valve is indicated generally by the reference numeral 10, and it may be the same as that shown in application, Serial No. 288,806, filed May 20, 1952, for tracer control mechanism. In this type of tracer valve a lever arm 11 is operatively connected and responsive to deflection of a tracer, so that oscillation of the lever about is fixed pivot 12 shifts the tracer valve plunger 13 in its housing 14. The tracer valve housing has two pressure ports 15 and 16, two motor ports 17 and 18, and two exhaust ports 19 and 20. The motor ports 17 and 18 are connected by channels 21 and 22 to ports 24 and 23 respectively of an intermediate selector valve 25 hydraulically connected between the tracer valve and a hydraulic motor 26, the rotation of which is controlled by the tracer valve. The selector valve has a plunger 27 which serves to select between manual and automatic control of the motor 26. Normally, the valve is in the automatic position shown, but if it should be in its lower manual control position when the hydraulic pressure is turned on and comes through line 22, it will automatically be shifted upward to the automatic position shown. In so doing, the port 23 is connected through the chamber 28 in the housing 25 to port 29 and thereby to channel 30 which leads to the hydraulic motor 26 to effect rotation of the motor in one direction. By this same shifting of the valve, the port 24 is connected by annular groove 31 in the plunger 27 to port 32 and thereby to channel 33 which leads to the hydraulic motor 26 to effect rotation thereof in the opposite direction.

The hydraulic motor is connected by gearing 27' to effect rotation of an eccentric 28', which eccentric is manually adjustable as shown in the patent to Roehm 2,332,533, issued October 26, 1943. In other words, when the eccentric is on center the valve plungers 34 and 35 are positioned in a central or stop position. The plunger 34 controls reversible operation of piston 36 slidable in cylinder 37, and operatively connected by piston rod 38 to a slide 39 of a machine tool. Similarly, the plunger 35 controls reversible operation of a piston 40 slidable in cylinder 41, and operatively connected by a piston rod 42 to a second slide 43 of a machine tool and usually arranged to slide in a direction normal to the direction of movement of the slide 39.

It is well known to those skilled in the art that the slides 39 and 43 may be utilized to control relative movement between a cutting tool and a work piece in any direction in a working plane of a machine tool regardless of whether that working plane is horizontal or vertical, and therefore it can be said that the tracer is operatively connected for controlling the resultant direction of movement produced by the fluid operable pistons 36 and 40. It will also be noted that the manner of controlling these pistons by means of an eccentric and reversing valves is the same as that shown in the Roehm patent supra.

It will be noted from the foregoing that the tracer valve is operatively connected to control the position of the two reversing valves, and after these two positions have been established for instantaneous operation, the rate of movement of either one or both of the pistons 36 and 40 will depend upon how much either one or both of the valves have been opened. In other words, in the instaneous position of the parts shown, the valve plunger 35 is in a central neutral position and no movement of piston 40 will take place whereas the valve 34 is partially open and the rate of movement of the piston 36 will depend on the pressure drop through the valve. The important point to note is that once the position of the direction valves 34 and 35 has been set up by the tracer, no further automatic control can be effected by the tracer on the rate of movement of the slides, the combined effect of which is known as the feed rate.

The modern demand is for higher tracing rates, but with the structure so far described the feed rate is limited by how fast a change in direction can be executed such as, for instance, turning a right angle corner. If the feed rate is so high during approach to the corner that the change in direction cannot be executed by the valves in the limited time allowed by the prevailing rate of feed, the cutter will overrun the corner and the pattern will not be accurately reproduced in the work. If the tracing operation happened to be an internal operation it will be obvious that overrun of the cutter will gouge out the corner and spoil the work.

In this invention the object is to slow down the feed rate whenever a change in direction is to be effected and therefore the construction is such that when the tracer valve is shifted from its neutral position, the overall feed rate is simultaneously reduced while the valves are being shifted to change the resultant direction of movement of the cutter. This is accomplished by providing a control valve 44 which is interposed between a pump 45 and the tracer valve. The delivery of the pump is connected through channel 46 to port 47 located in the end of the control valve housing 44 whereby the fluid pressure will enter the end chamber 48 and continuously apply pressure on the end of a valve plunger 49 slidably mounted in the housing 44. The plunger 49 has a suitable tapered end 50 which moves realtive to a port 51 to change the resistance to flow from the chamber 48 to the channel 52 which leads to the pressure ports 15 and 16 of the tracer valve.

When the tracer valve plunger 13 is in the central or neutral position shown in the drawing, there will be substantially no flow through the channel 52, and the pressure in channel 52 will be substantially equal to the presure in the chamber 48. The channel 52 is connected through a branch line 53 and a check valve 54 to port 55 located in the right hand end of the valve housing 44. This creates a pressure in the right hand chamber 56 of the valve housing which, augmented by a spring 57, is sufficient to balance the pressure in the chamber 48 and thereby hold the valve plunger 49 in a balanced condition but still in such a position that it almost closes the port 51. Under these circumstances it will be seen that, as soon as either one of the tracer valve ports 15 or 16 open and permit flow from the channel 52, the pressure in channel 52 will immediately drop, and this drop in pressure will be communicated through a low resistance 58 to the chamber 56, causing a drop in pressure in that chamber sufficient for the pressure in chamber 48 to overcome it and move the valve plunger 49 to the right and thereby open port 51 to permit a greater flow to the tracer valve and thereby, through the valve mechanism operatively connected thereto, effect a change in the feed rate.

However, the reversing valves 34 and 35 discharge into a common return line 59, and this return line is connected to a port 60 of the control valve 44. The valve plunger 49 has a tapered throttle portion 61 movable relative to the port 60 and normally in a position as shown in the drawings to maintain the port open and permit flow therethrough to the annular groove 62 in the valve plunger and port 63 to the reservoir return channer 64. Now it will be seen that when the plunger 49 is shifted to the right in response to tracer action that immediately the return line from the slide motors is blocked; thereby slowing down the rate of movement thereof until the increased flow in channel 52 has had a chance to work on the valve structure and change the rate of relative movement of the slides.

A modified form of this invention is shown in Figure 2 of the drawings in which a tracer valve, indicated generally by the reference numeral 64' controls the direction of movement of a piston 65 slidably mounted in a cylinder 66 and operatively connected by a piston rod 67 to one of two slides of a machine tool.

The other slide of the machine tool may be operatively connected to a piston rod 68 of piston 69 slidably mounted in a cylinder 70. The cylinder 70 is connected by channels 71 and 72 to a reversing valve 73 and the return line 74 from the reversing valve is connected to the port 60 of the control valve 44 which is the same as the control valve 44 shown in Figure 1. The supply port 75 of the tracer valve 64' is connected by channel 76 to port 51 of the control valve 44. The pump 45 is still connected to the port 47, and a separate pump 77 is provided for supplying pressure to the cylinder 70 through port 78, whereas the pump 71 in Figure 1 supplies pressure to both of the slide cylinders.

From the foregoing description, it will now be apparent that the control valve 44 is sensitive to the position of the tracer valve, but that its movement is much greater than the tracer valve and, therefore, can exert a much greater effect in opening and closing ports, and therefore a much greater effect on the circuit. The valve is normally balanced, but as soon as it becomes unbalanced, it moves all the way to close the return port, and thereby immediately slows down the feed rate. In some prior constructions, this function of restricting the return flow is incorporated in the tracer valve itself, but the tracer valve has such small movements that it is practically ineffective as a feed rate control. By means of this invention, the function of controlling the feed rate is separated from the tracer valve and assigned to a separate valve that has a greater physical length of movement than the tracer valve and therefore can be much more effective.

What is claimed is:

1. In a tracer control circuit having fluid operable means for producing relative movement between a tool and work and a tracer valve operatively connected to said fluid operable means for determining the extent and direction of said relative movement, the combination of a source of pressure for supplying said tracer valve, a return line from said fluid operable means whereby resistance in said return line will slow operation of said fluid operable means, and a common valve member having connecting means for variably connecting said source of pressure to said tracer valve and a second connecting means for controlling the variable connection of said return line to exhaust and operable simultaneously to open one of said connecting means and close the other.

2. In a tracer controlled circuit for governing operation of a hydraulic feed means of a pattern controlled machine, said feed means having a common return line, the combination of a tracer valve, a pressure supply line connected to the tracer valve, means operatively connecting said tracer valve to said feeding means for changing the direction of feed effected thereby by opening and closing said tracer valve to start and stop flow in said supply line, and throttling means serially connected in said return line and operatively connected to said supply line in responsive realtion to the flow condition therethrough to effect operation of said throttling means during flow in said supply line.

3. In a tracer control circuit for governing operation of a hydraulic feeding means of a pattern control machine, said feeding means having a common return line, the combination of a tracer valve, a pressure supply line connected to said valve, means operatively connecting said valve to said feeding means for changing the direction of feed effected thereby in response to opening and closing said tracer valve, a valve member having independent throttling means serially connected in said supply line and in said return line respectively, said throttling means being inversely operative on movement of the valve member to increase the flow in one line and simultaneously decrease the flow in the other line, and means operatively connecting said valve member to said supply line for operation in response to flow conditions therein.

4. In a tracer controlled circuit for governing operation of a hydraulic feeding means of a pattern controlled machine, said feeding means having a common return line, the combination of a tracer valve operatively connected to said feeding means for changing the direction of feed effected thereby in response to opening and closing said tracer valve, a pressure supply line connected to said tracer valve, a common valve member having separate throttling means serially connected in each of said lines, means connecting the pressure differential across the throttling means in the pressure supply line to opposite ends of said valve member, said throttling means being inversely arranged whereby movement of the valve member in one direction will open one line and throttle the other line, and spring means to bias the valve member in a direction to throttle the pressure supply line.

References Cited in the file of this patent

UNITED STATES PATENTS

| | | |
|---|---|---|
| 2,332,533 | Roehm | Oct. 26, 1943 |
| 2,335,305 | Parsons | Nov. 30, 1943 |